United States Patent
Yan

(10) Patent No.: US 11,863,692 B2
(45) Date of Patent: Jan. 2, 2024

(54) DIGITAL CERTIFICATE PROCESSING METHOD AND DEVICE, BLOCKCHAIN NODE AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventor: Junzhi Yan, Beijing (CN)

(73) Assignees: CHINA MOBILE COMMUNICATION CO., LTD RESEARCH INST, Beijing (CN); CHINA MOBILE COMMUNICATIONS GROUP CO., LTD., Beijing (CN)

(*) Notice: Subject to any disclaimer, the term of this patent is extended or adjusted under 35 U.S.C. 154(b) by 73 days.

(21) Appl. No.: 17/046,780

(22) PCT Filed: Apr. 1, 2019

(86) PCT No.: PCT/CN2019/080881
§ 371 (c)(1),
(2) Date: Oct. 10, 2020

(87) PCT Pub. No.: WO2019/196696
PCT Pub. Date: Oct. 17, 2019

(65) Prior Publication Data
US 2021/0167973 A1 Jun. 3, 2021

(30) Foreign Application Priority Data
Apr. 12, 2018 (CN) .......................... 201810327867.6

(51) Int. Cl.
H04L 29/06 (2006.01)
H04L 9/32 (2006.01)
H04L 9/40 (2022.01)

(52) U.S. Cl.
CPC .......... *H04L 9/3268* (2013.01); *H04L 9/3265* (2013.01); *H04L 63/0823* (2013.01)

(58) Field of Classification Search
CPC .. H04L 9/3268; H04L 9/3265; H04L 63/0823
See application file for complete search history.

(56) References Cited

U.S. PATENT DOCUMENTS 6,839,841 B1 * 1/2005 Medvinsky ........... H04L 63/062
713/168
10,102,526 B1 * 10/2018 Madisetti ............. G06Q 20/389
(Continued)

FOREIGN PATENT DOCUMENTS

CN 101860535 A 10/2010
CN 106385315 A 2/2017
(Continued)

OTHER PUBLICATIONS

George Pîrlea et al., Mechanising Blockchain Consensus, Jan. 8, 2018, ACM, pp. 78-90. (Year: 2018).*

(Continued)

*Primary Examiner* — Luu T Pham
*Assistant Examiner* — Fahimeh Mohammadi
(74) *Attorney, Agent, or Firm* — Syncoda LLC; Feng Ma

(57) ABSTRACT

A digital certificate processing method includes: receiving a distribution request for a digital certificate, wherein the digital certificate does not contain validity period information; acquiring a verification result for the digital certificate; and according to the verification result, recording the digital certificate which has passed verification to a blockchain.

5 Claims, 9 Drawing Sheets

(56) References Cited

U.S. PATENT DOCUMENTS

| | | | |
|---|---|---|---|
| 10,284,379 B1 | 5/2019 | Muftic | |
| 10,454,690 B1* | 10/2019 | Popoveniuc | H04L 9/3268 |
| 10,547,457 B1* | 1/2020 | Duccini | H04L 9/50 |
| 2005/0177715 A1* | 8/2005 | Somin | H04L 67/1046 |
| | | | 713/156 |
| 2005/0188196 A1* | 8/2005 | Kakii | H04L 9/3263 |
| | | | 713/156 |
| 2013/0067219 A1* | 3/2013 | Grajek | H04L 63/0823 |
| | | | 713/156 |
| 2014/0373118 A1* | 12/2014 | Doi | H04L 9/3268 |
| | | | 726/6 |
| 2016/0127355 A1* | 5/2016 | Akehurst-Ryan | H04L 9/3268 |
| | | | 713/156 |
| 2017/0324711 A1 | 11/2017 | Feeney et al. | |
| 2017/0338967 A1* | 11/2017 | Lewison | H04L 9/0643 |
| 2017/0346639 A1* | 11/2017 | Muftic | H04L 9/3247 |
| 2017/0346693 A1* | 11/2017 | Dix | H04L 41/0803 |
| 2018/0102905 A1* | 4/2018 | Bowen | H04L 9/321 |
| 2018/0262347 A1* | 9/2018 | Levy | H04L 9/006 |
| 2019/0036710 A1 | 1/2019 | Qiu | |
| 2019/0036711 A1* | 1/2019 | Qiu | H04L 9/3268 |
| 2019/0036712 A1 | 1/2019 | Qiu | |

FOREIGN PATENT DOCUMENTS

| | | | |
|---|---|---|---|
| CN | 107360001 A | 11/2017 | |
| CN | 107368259 A | 11/2017 | |
| CN | 107508680 A | 12/2017 | |
| CN | 107508682 A | 12/2017 | |
| CN | 107592293 A | 1/2018 | |
| CN | 107769922 A | 3/2018 | |

OTHER PUBLICATIONS

Zhangbo Duan et al., Formal Modeling and Verification of Blockchain System, Jan. 8, 2018, ACM, pp. 231-235. (Year: 2018).*

Yuting Chen et al., Guided Differential Testing of Certificate Validation in SSL/TLS Implementations, Aug. 30, 2015, ACM, pp. 793-804. (Year: 2015).*

Lakshmi Siva Sankar et al., Survey of Consensus Protocols on Blockchain Applications, Aug. 24, 2017, IEEE, pp. 1-5. (Year: 2017).*

International Search Report in the international application No. PCT/CN2019/080881, dated Jun. 20, 2019.

English translation of the Written Opinion of the International Search Authority in the international application No. PCT/CN2019/080881, dated Jun. 20, 2019.

Wang Tian, Design and Implementation of CAS Single Sign on and the Unified Identity Authentication System Based on, China's outstanding master's thesis full-text database, Mar. 31, 2016 (Mar. 31, 2016), section 17.

Hitesh Tewari et al: "X509Cloud-Framework for a Ubiquitous PKI", Apr. 24, 2017 (Apr. 24, 2017), XP055404522.

Supplementary European Search Report in the European application No. 19785467.2, dated Apr. 26, 2021.

* cited by examiner

DIGITAL CERTIFICATE PROCESSING METHOD AND DEVICE, BLOCKCHAIN NODE AND STORAGE MEDIUM

CROSS-REFERENCE TO RELATED APPLICATIONS

This application is a U.S. national stage of International Application No. PCT/CN2019/080881 filed on Apr. 1, 2019, which claims priority to Chinese Patent Application No. 201810327867.6, filed on Apr. 12, 2018. The disclosures of these applications are hereby incorporated by reference in their entireties.

TECHNICAL FIELD

The present disclosure relates to, but is not limited to, the technical field of information security, in particular to a method and apparatus for processing a digital certificate, a blockchain node and a storage medium.

BACKGROUND

Public Key Infrastructure (PKI) plays an important role in the field of information security, and is widely used in various security activities such as data encryption, decryption, data integrity protection, digital signature, and identity authentication. The digital certificate is an important carrier in the realization of a PKI technology. The content of the digital certificate generally includes: information of a certificate holder, information of a certificate issuing authority, a public key of the holder, a certificate validity period, a certificate purpose, and the certificate issuing authority.

The digital certificate is generally issued by an authority, and the process of issuing the digital certificate may also be referred to as a Certification Authority (CA) process. In the existing PKI technology, a CA is the core of PKI and a starting point of trust. If a CA can be controlled, the CA can be utilized to issue digital certificates at will. Therefore, the core CA is extremely vulnerable to attacks. Once a CA is compromised, all digital certificates issued by the CA are no longer secure and cannot be used any more.

A blockchain technology is based on a distributed storage system. Multiple verification nodes can verify the issued digital certificate based on a consensus mechanism, and perform distributed storage after passing the verification. Therefore, if the digital certificate is combined with the blockchain technology, the above problems can be solved smoothly.

There is a big problem in the blockchain. The blockchain will contain all historical digital certificates. As time goes by, the number of digital certificates stored in the blockchain will continue to increase. The amount of data stored in the entire blockchain will increase gradually, and storage and computing resources of verification nodes are required to increase gradually, which will bring a serious burden to the verification node and affect the operation of the verification nodes and user experience.

Therefore, the technical problems to be urgently solved in the conventional art are how to reduce the amount of data storage of the digital certificate in the blockchain, reduce storage resources and also reduce the amount of computations and computing resources required for computation and verification in the subsequent growth process of the blockchain.

SUMMARY

In view of this, in embodiments of the present disclosure, it is desired to provide a method and apparatus for processing a digital certificate, a blockchain node and a storage medium, which at least partially solve the above problems.

The technical solution of the present disclosure is implemented as follows.

In a first aspect, an embodiment of the present disclosure provides a method for processing a digital certificate, which may include:
- an issuing request for a digital certificate which does not contain validity period information is received;
- a verification result of the digital certificate is acquired; and
- the digital certificate which has passed verification is recorded to a blockchain according to the verification result.

In a second aspect, an embodiment of the present disclosure provides a method for processing a digital certificate, which may include:
- an issuing request for a digital certificate which does not contain validity period information is received;
- an effective time of the digital certificate is determined;
- if the effective time of the digital certificate is reached, the digital certificate is verified to obtain a verification result; and
- the verification result of the digital certificate is issued.

In a third aspect, an embodiment of the present disclosure provides a method for processing a digital certificate, which may include:
- a first receiving module, configured to receive an issuing request for a digital certificate which does not contain validity period information;
- an acquisition module, configured to acquire a verification result of the digital certificate; and
- a recording module, configured to record, according to the verification result, the digital certificate which has passed verification to a blockchain if an effective time of the digital certificate is reached.

In a fourth aspect, an embodiment of the present disclosure provides an apparatus for verifying a digital certificate, which may include:
- a second receiving module, configured to receive an issuing request for a digital certificate which does not contain validity period information;
- a determination module, configured to determine an effective time of the digital certificate;
- a verification module, configured to verify, if the effective time of the digital certificate is reached, the digital certificate to obtain a verification result; and
- an issuing module, configured to issue the verification result of the digital certificate.

In a fifth aspect, an embodiment of the present disclosure provides a blockchain node, which may include:
- a transceiver, configured to send and receive information;
- a memory, configured to store the information, and at least store a computer-executable instruction; and
- a processor, connected to the transceiver and the memory respectively, configured to control the transceiver and the memory to run, and capable of implementing the method for processing a digital certificate provided by any one of the embodiments in the first aspect or the second aspect by executing the computer-executable instruction.

In a sixth aspect, an embodiment of the present disclosure provides a computer storage medium having stored therein computer-executable instructions that when executed, are capable of implementing the method for processing a digital certificate provided by any one of the embodiments in the first aspect or the second aspect.

The embodiments of the present disclosure provide the method and apparatus for processing a digital certificate, the blockchain node and the storage medium.

On the one hand, the digital certificate itself no longer contains the validity period information, so compared to the digital certificate including the validity period information, the amount of data is reduced. For a large amount of digital certificates stored, the amount of data is greatly reduced.

On the other hand, if the effective time is reached, the verified digital certificate will be recorded in the blockchain. The digital certificate recorded in the blockchain is at the effective time, avoiding the problems of long blockchain and much recorded information caused by recording of ineffective digital certificates. Therefore, the blockchain generated using the embodiment of the present disclosure has the characteristics of small amount of data and small occupied storage space.

Further, if the amount of data in the blockchain is reduced, the amount of data that needs to be verified during the growth of the blockchain is also reduced, so the amount of computations and the resources consumed by verification can be reduced, the verification efficiency can be improved, and verification resources can be saved.

DETAILED DESCRIPTION

The technical solutions of the present disclosure are further described in detail below in conjunction with the drawings and specific embodiments.

Figure 1:
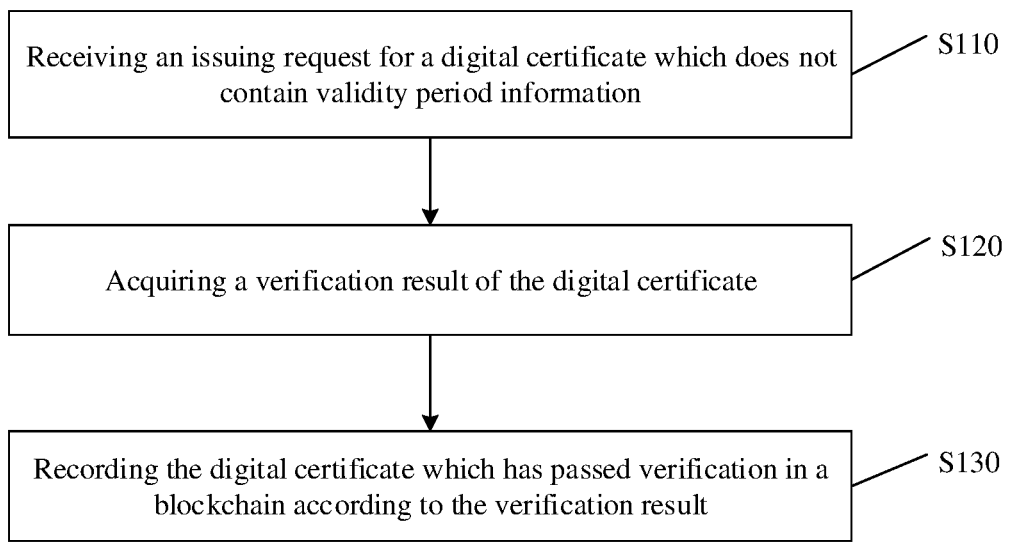
FIG. 1 is a schematic flowchart of a first method for processing a digital certificate according to an embodiment of the present disclosure.

As illustrated in FIG. 1, the present embodiment provides a method for processing a digital certificate, which includes the following steps.

In step S110, an issuing request for a digital certificate which does not contain validity period information is received.

In step S120, a verification result of the digital certificate is acquired.

In step S130, the digital certificate which has passed verification is recorded to a blockchain according to the verification result. Optionally, the step S130 may include: if an effective time of the digital certificate is reached, the digital certificate which has passed verification is recorded to the blockchain according to the verification result.

The digital certificate processing method provided in the present embodiment may be a method applied to an accounting node in a blockchain system. In the present embodiment, the digital certificate requested to be issued received by the accounting node does not contain the validity period information. Therefore, the digital certificate provided in the present embodiment has less content than a digital certificate containing validity period information, and the digital certificate itself occupies less storage space in terms of the amount of information.

At the same time, the accounting node will obtain a verification result of the digital certificate. The verification result may be a verification result issued by the accounting node after verification based on a consensus mechanism. The verification result may indicate whether the digital certificate has passed verification.

In step S130, only when the effective time of the digital certificate is reached, the digital certificate which has passed verification is recorded to the blockchain according to the verification result.

In some embodiments, it is determined whether the digital certificate is passed according to the verification result and based on the consensus mechanism. For example, if there are N verification nodes participating in the verification of the digital certificate, and only the verification result issued by verification nodes reaching a predetermined ratio indicates that the digital certificate has passed verification, or the verification result provided by a predetermined number of verification nodes indicates that the digital certificate has passed verification, it is finally determined that the digital certificate has passed verification, and the operation of recording the digital certificate in the blockchain is performed.

Therefore, the digital certificates recorded in the blockchain in the present embodiment all have the following characteristics.

1. The digital certificate itself recorded in the blockchain does not contain the validity period information, the amount of data generated by the digital certificate itself is small, and the storage space occupied is small.

2. The digital certificates recorded in the blockchain have reached their effective time, that is, there will be no digital certificates that have not reached the effective time in the blockchain, so as to avoid the problems of more blocks in the blockchain and long blockchain caused by introduction of ineffective digital certificates into the blockchain. Therefore, the problems of long verification time and large verification resource consumption in the block generation process of the blockchain can be reduced.

In order to ensure that the digital certificates written in the blockchain have reached their effective time, in the present embodiment, the accounting node needs to determine whether the current time has reached the effective time of the digital certificate, or the verification node may issue the verification result at the effective time. Therefore, if the accounting node receives the verification result issued at the effective time, the accounting node may default to the current time having reached the effective time of the digital certificate corresponding to the verification result.

In some embodiments, the step S110 may include:
an issuing request carrying the validity period information is received. The validity period information is used to determine the effective time.

In the present embodiment, the issuing request includes a digital certificate to be issued and validity period information that is not included in the digital certificate but corresponds to the digital certificate. At this time, after receiving the issuing request, the accounting node will determine the effective time according to the validity period information in the issuing request.

In some embodiments, the validity period information includes at least: indication information of the effective time of the digital certificate.

In some other embodiments, the step S110 may include:
the issuing request in default of the validity period information is received.
The effective time is based on a pre-appointment.

In the present embodiment, the issuing request itself does not carry a digital certificate, and the issuing request does not carry validity period information. Then, the accounting node may determine the effective time according to a pre-appointment. For example, the accounting node may determine the effective time according to a default criterion, and the effective time may also be determined according to pre-negotiation with the issuing node.

Figure 2:
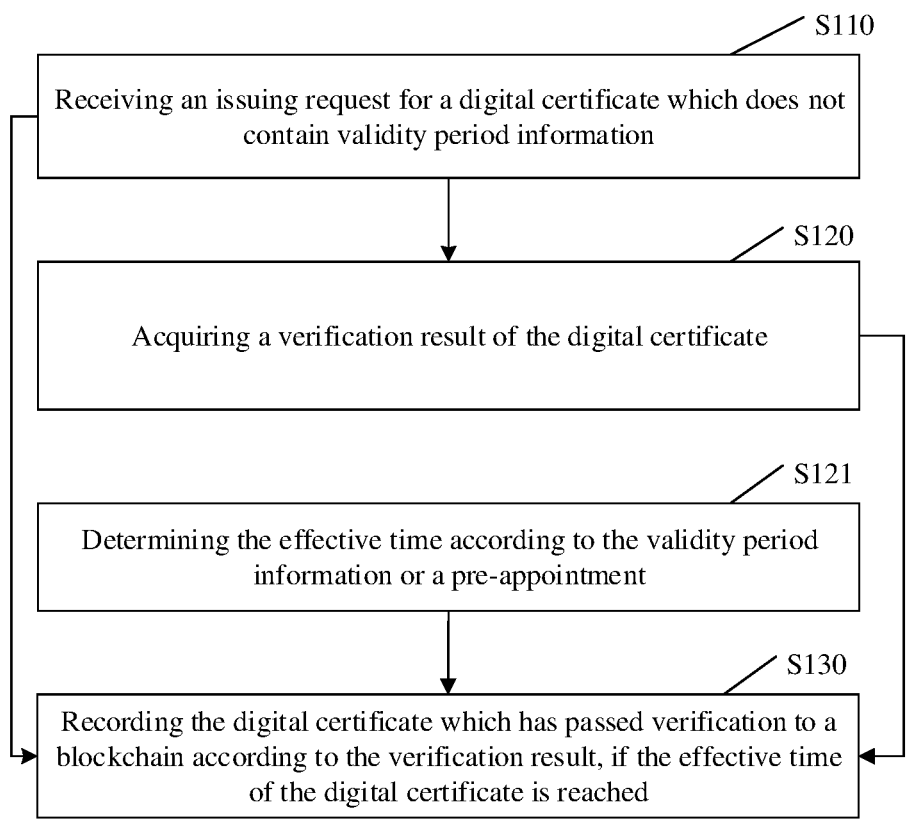
FIG. 2 is a schematic flowchart of a second method for processing a digital certificate according to an embodiment of the present disclosure.

Therefore, as illustrated in FIG. 2, the method includes the following steps.

In step S121, the effective time is determined according to the validity period information or the pre-appointment.

In the present embodiment, after receiving the issuing request and/or the verification result, the accounting node will determine the effective time according to the validity period information carried in the issuing request or the pre-appointment. After the effective time is determined, it is determined whether the effective time is currently reached, and if the effective time is reached, the digital certificate that has passed verification is added to the blockchain.

In some other embodiments, the step S120 may include: the verification result issued when the effective time is reached is acquired.

If the verification node issues the verification result when the effective time is reached, once the accounting node receives the verification result of a certain digital certificate issued by the verification node, indicating that the current effective time has been reached, the accounting node may directly add the digital certificate that has passed verification to the blockchain according to the verification result without verifying whether the effective time is reached currently. Therefore, the digital certificate added to the blockchain also reaches the effective time thereof.

Figure 3:
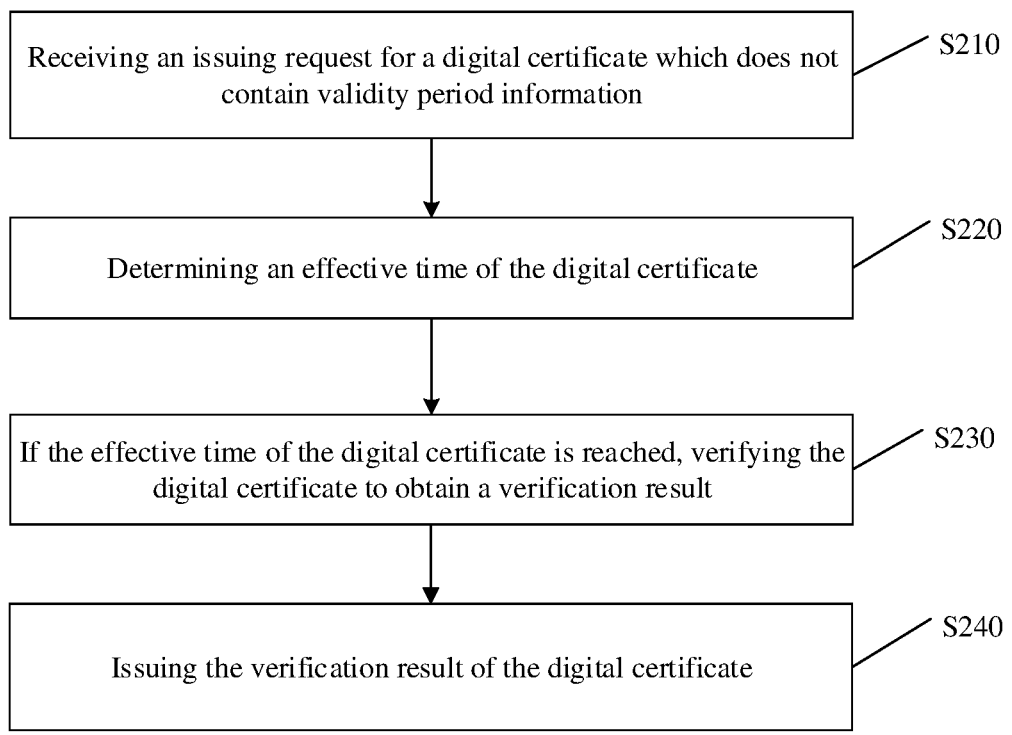
FIG. 3 is a schematic flowchart of a third method for processing a digital certificate according to an embodiment of the present disclosure.

As illustrated in FIG. 3, the present example provides a method for processing a digital certificate, which includes the following steps.

In step S210, an issuing request for a digital certificate which does not contain validity period information is received.

In step S220, an effective time of the digital certificate is determined.

In step S230, if the effective time of the digital certificate is reached, the digital certificate is verified to obtain a verification result.

In step S240, the verification result of the digital certificate is issued.

The method for processing a digital certificate provided in the present embodiment may be a method applied to a verification node, and the digital certificate carried in the issuing request received by the verification node itself does not carry validity period information.

In some embodiments, the verification node may directly verify the digital certificate based on the consensus mechanism, and then issue the verification result in a blockchain network. Then, a recording node writes the digital certificate that has passed verification into the blockchain at the effective time. However, in the present embodiment, the verification node determines the effective time of the digital certificate, and only when the effective time is reached, the corresponding digital certificate is verified and the verification result is issued. The effective time of the digital certificate corresponding to the verification result issued in the blockchain network in this way has been reached.

In the present embodiment, the verification of the digital certificate includes at least one of the following:
verification of whether the content of the digital certificate is correct;
verification of whether the content of the digital certificate is complete; and
verification of whether the digital certificate is still within the validity period.

Optionally, the step S210 may include: the issuing request carrying the validity period information is received. The step S220 may include: the effective time is determined according to the validity period information.

The validity period information includes at least indication information of the effective time, so that the effective time may be determined according to the validity period information. In other embodiments, the validity period information may also include: an end time of the digital certificate. In this way, when the digital certificate stops being used depends on the end time.

In some embodiments, the step S210 may include: the issuing request in default of the validity period information is received. The step S220 may include: the effective time is determined according to the pre-appointment.

In some embodiments, if the issuing request does not carry clear validity period information, the verification node will determine the effective time according to a pre-appointment.

For example, in the embodiment of the present invention, the issuing request is provided with a validity period field, and the validity period field is used to carry the validity period information. If the value of the validity period field is a specified value, it means that the issuing node defaults to the validity period information, the verification node needs to determine the effective time according to a pre-appointment. For example, the specified value may be "0".

In some embodiments, the digital certificates may be issued one by one or in batches; however, in the embodiment of the present disclosure, no matter issued one by one or issued in batches, the digital certificates do not include validity period information. It is worth noting that if digital certificates are issued in batches, the issuing request carrying validity period information may only carry common validity period information of multiple digital certificates issued in batches. Therefore, when the effective time is reached, the accounting node may write the digital certificates issued in batches into blocks of the blockchain together. Since digital certificates are issued in batches, the issuing node may also set the validity period information of the digital certificates issued in batches in a blockchain network, and the accounting node and the verification node may also determine the effective time of the digital certificate through the specially issued validity period information. Regardless of how the effective time of the digital certificate is determined, the accounting node will only record the corresponding digital certificate in the blockchain when the effective time of the digital certificate is reached.

Figure 4:
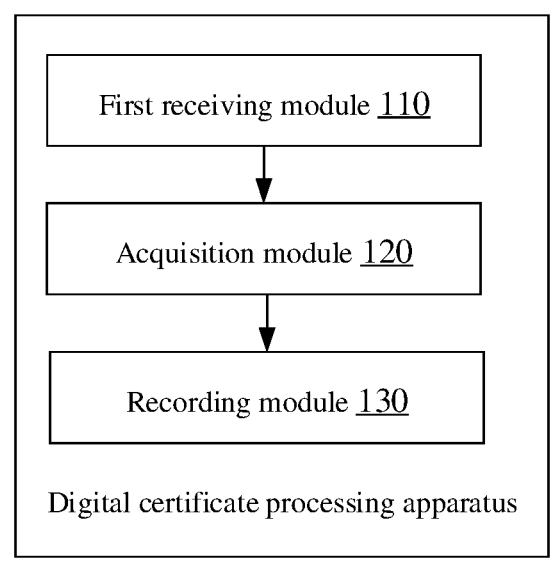
FIG. 4 is a schematic structure diagram of an apparatus for processing a digital certificate according to an embodiment of the present disclosure.

As illustrated in FIG. 4, the present embodiment provides an apparatus for processing a digital certificate, which includes a first receiving module 110, an acquisition module 120 and a recording module 130.

The first receiving module 110 is configured to receive an issuing request for a digital certificate which does not contain validity period information.

The acquisition module 120 is configured to acquire a verification result of the digital certificate.

The recording module 130 is configured to record, according to the verification result, the digital certificate which has passed verification to a blockchain.

In some embodiments, the recording module 130 is configured to record, according to the verification result, the digital certificate which has passed verification to a blockchain if an effective time of the digital certificate is reached.

The apparatus for processing a digital certificate may be applied to an accounting node. In the present embodiment, the first receiving module 110, the acquisition module 120, and the recording module 130 are all program modules. After the program modules are executed by a processor, the reception of an issuing request, the reception or automatic generation of a verification result and the generation of a block in a blockchain can be realized.

In some embodiments, the accounting node itself also serves as a verification node, and the operation that the verification result is acquired may include: the digital certificate is verified by itself, so as to obtain the verification result of the digital certificate.

In short, in the present embodiment, the digital certificate itself does not carry the validity period information, and the accounting node only records the valid digital certificate in the blockchain, thereby avoiding the introduction of a large number of ineffective digital certificates in the blockchain, greatly reducing the amount of data on the blockchain, and reducing storage resources occupied by the blockchain and the amount of verification data that needs to be verified for the continued growth of the blockchain.

The first receiving module 110 is configured to receive an issuing request carrying the validity period information. The validity period information is used to determine the effective time.

The first receiving module 110 may be configured to receive an issuing request in default of the validity period information. The effective time is based on a pre-appointment.

In some other embodiments, the apparatus further includes an effective time determination module.

The effective time determination module is configured to determine the effective time according to the validity period information or the pre-appointment.

In some other embodiments, the acquisition module 120 is further configured to acquire the verification result issued when the effective time is reached.

Figure 5:
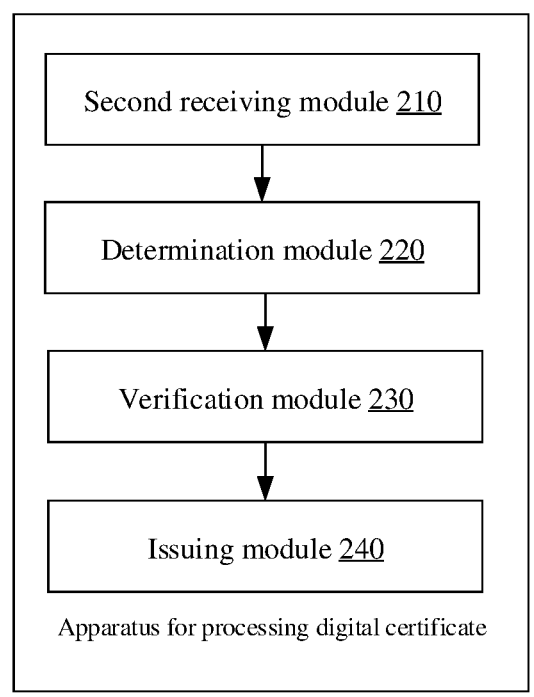
FIG. 5 is a schematic structure diagram of another apparatus for processing a digital certificate according to an embodiment of the present disclosure.

As illustrated in FIG. 5, the present embodiment provides an apparatus for processing a digital certificate, which includes a second receiving module 210, a determination module 220, a verification module 230 and an issuing module 240.

The second receiving module 210 is configured to receive an issuing request for a digital certificate which does not contain validity period information.

The determination module 220 is configured to determine an effective time of the digital certificate.

The verification module 230 is configured to verify, if the effective time of the digital certificate is reached, the digital certificate to obtain a verification result.

The issuing module 240 is configured to issue the verification result of the digital certificate.

The second receiving module 210, the determination module 220, the verification module 230, and the issuing module 240 in the present embodiment may all correspond to program modules. The program modules may be executed by a processor or a processing circuit. If they are executed by the processor or the processing circuit, operations such as the reception of an issuing request, the determination of an effective time and the verification of a digital certificate can be realized, so that the verification result of the digital certificate is available in a blockchain network, and it is convenient for the accounting node to record the digital certificate that has passed verification to the blockchain.

The second receiving module 210 is configured to receive the issuing request carrying the validity period information. The determination module 220 is configured to determine the effective time according to the validity period information.

Further, the second receiving module 210 may be further configured to receive an issuing request in default of the validity period information. The determination module 220 may be further configured to determine the effective time according to a pre-appointment.

Figure 6:
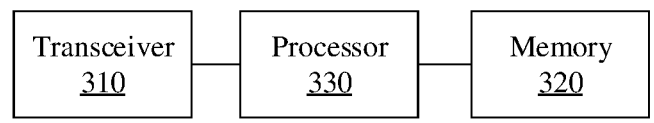
FIG. 6 is a schematic structure diagram of a blockchain node according to an embodiment of the present disclosure.

As illustrated in FIG. 6, the present embodiment provides a blockchain node, which includes a transceiver 310, a memory 320 and a processor 330.

The transceiver 310 is configured to send and receive information.

The memory 320 is configured to store the information, and at least store a computer-executable instruction.

The processor 330 is connected to the transceiver 310 and the memory 320 respectively, configured to control the transceiver 310 and the memory 320 to run, and capable of implementing the method for processing a digital certificate provided by any one of the foregoing embodiments by executing the computer-executable instruction. For example, one or more of the methods illustrated in FIG. 1 to FIG. 3 may be implemented.

The blockchain node provided in the present embodiment may be the foregoing accounting node or verification node. If the blockchain node is the foregoing accounting node, at least one or more of the foregoing methods illustrated in FIGS. 1 to 2 may be performed. If the blockchain node is the foregoing verification node, at least the method illustrated in FIG. 3 may be performed.

The transceiver 310 may correspond to various types of communication interfaces, for example, a wired interface or a wireless interface.

The memory 320 may include a storage medium, and may store various information, for example, computer-executable instructions that may be executed by a processor, for example, target programs and/or source programs that may be executed by a computer.

The processor 330 may be respectively connected to the memory and the transceiver through various bus structures such as an integrated circuit bus, so as to be able to implement processings such as digital certificate recording and verification provided by one or more technical solutions.

The embodiment of the present disclosure also provides a computer storage medium, having a computer-executable instruction stored therein. After the computer-executable instruction is executed, the method for processing a digital certificate provided by one or more of the foregoing embodiments can be implemented. For example, one or more of the methods illustrated in FIG. 1 to FIG. 3 may be implemented.

The computer storage medium provided by the present embodiment may be various media capable of storing program codes, such as a mobile storage device, a Read-Only Memory (ROM), a Random Access Memory (RAM), a magnetic disk, or an optical disk. Optionally, the computer storage medium may include a non-transitory storage medium.

In several embodiments provided by the present disclosure, it is to be understood that the disclosed device and method may be implemented in other manners. The device embodiments described above are merely illustrative. For example, the division of the unit is only a logical function division. In actual implementation, there may be another division manner, for example, multiple units or components may be combined or integrated into another system, or some features may be ignored or not executed. In addition, coupling or direct coupling or communication connection displayed or discussed between various components may be indirect coupling or communication connection between devices or units through some interfaces, and may be electrical, mechanical or otherwise.

Figure 7:
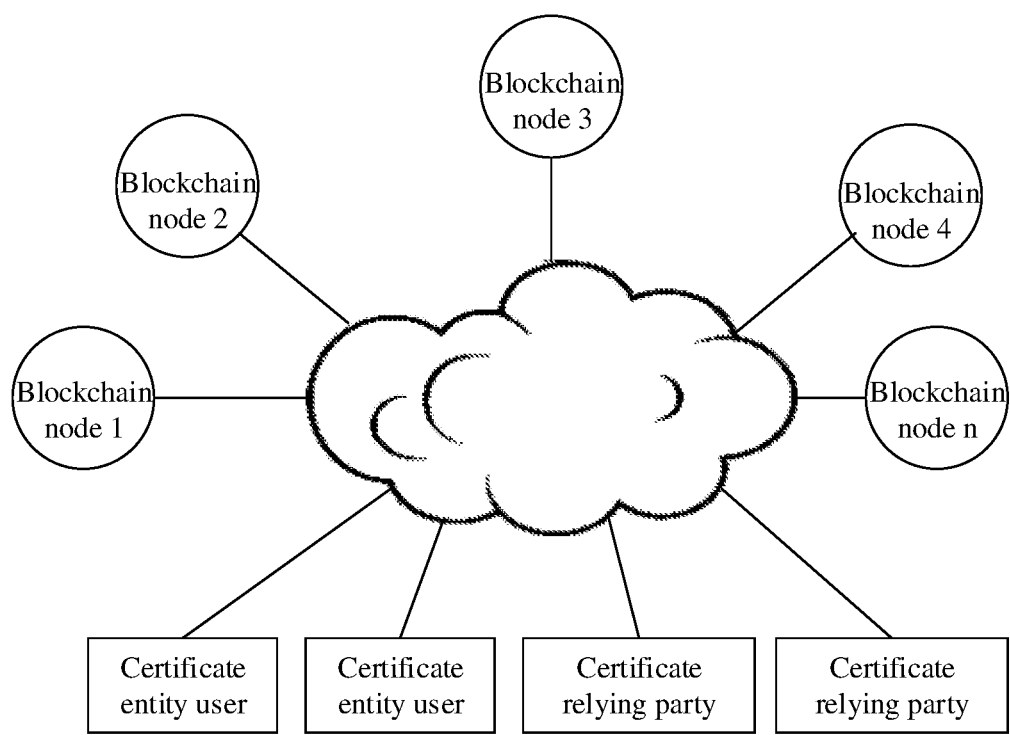
FIG. 7 is a schematic structure diagram of a blockchain system according to an embodiment of the present disclosure.

Several specific examples are provided below in connection with any of the above embodiments:

FIG. 7 shows a blockchain system, including: multiple blockchain nodes.

Figure 8:
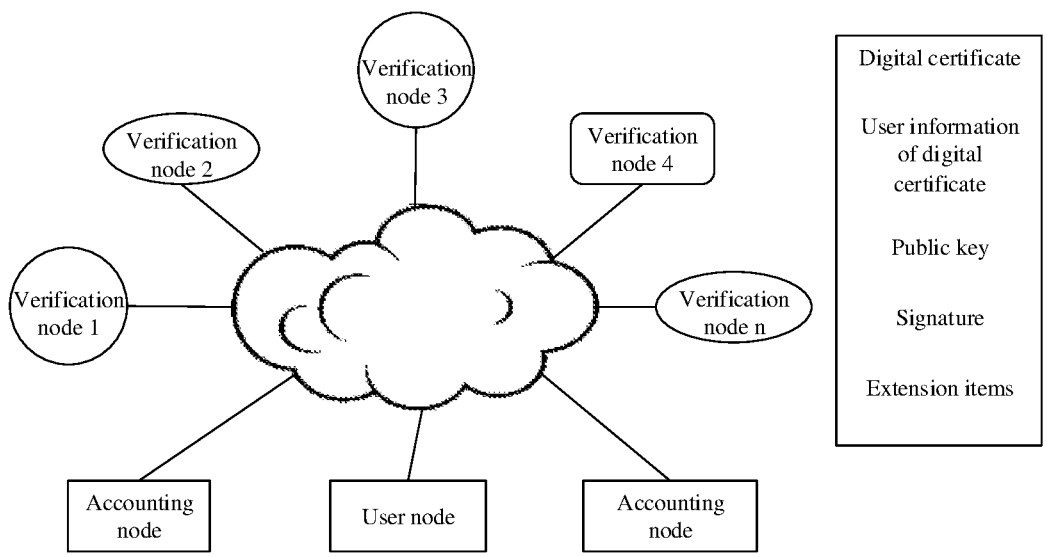
FIG. 8 is a schematic structure diagram of another blockchain system according to an embodiment of the present disclosure.

These blockchain nodes may be used for distributed storage of digital certificates. FIG. 8 shows a blockchain system in which the blockchain nodes illustrated in FIG. 7 are divided into accounting nodes and verification nodes. FIG. 7 shows that the blockchain system includes multiple blockchain nodes, for example, a blockchain node 1 to a blockchain node n. FIG. 8 shows a Boakai base station node, a verification node 1 to a verification node n in the blockchain system, and also displays a user node. The user node illustrated in FIG. 8 may correspond to a certificate entity user in FIG. 7.

The blockchain node is used to verify user requests and generate new blocks through consensus algorithms.

The certificate entity user is an owner of an end entity certificate.

A certificate relying party is a user who trusts a certificate system.

The above three types of nodes are all logical nodes.

The present example uses a simplified digital certificate, which mainly includes information such as user names, public keys, extension item, and digital signatures. The user name is used to identify the user's identity, the public key is a public key of the certificate user, the extension item is used to mark that the certificate is generated and used based on the blockchain, and the digital signature means that the certificate user uses a corresponding private key to sign the certificate.

Figure 9:
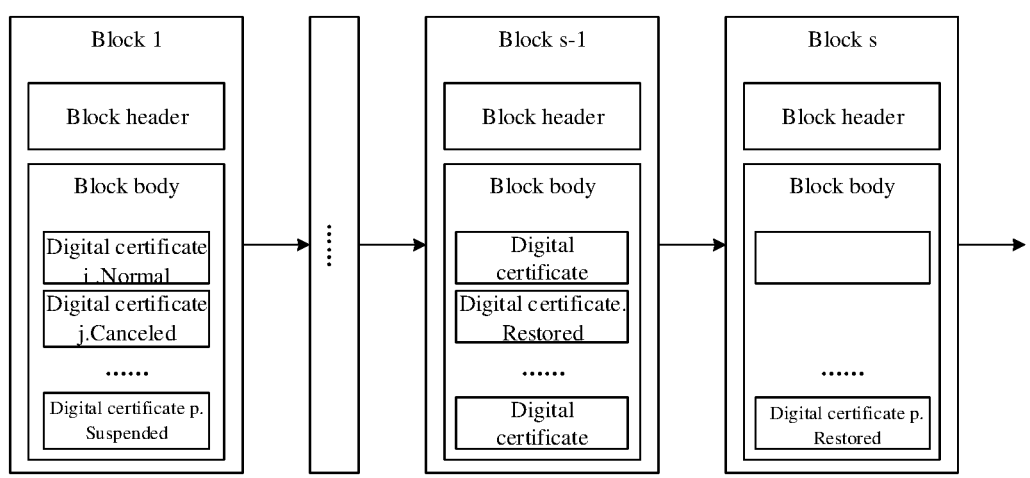
FIG. 9 is a blockchain storing a digital certificate according to an embodiment of the present disclosure.

As illustrated in FIG. 9, the blockchain is formed by linking individual blocks to form a blockchain. FIG. 9 shows block 1 to block s. A block is divided into a block header and a block body. The block header may store information such as a signature linked to the previous block. The block body contains several records, and each record includes the certificate information and certificate status of a digital certificate. The certificate information may be the value of the certificate after function calculation (for example, hash transformation such as Hash function), or the certificate itself without transformation. The certificate status may be normal, canceled, suspended, etc. The certificate information includes certificate content or information related to the certificate content.

The certificate entity user generates a digital certificate, which includes information such as user names, public keys, signatures, and extension items.

The certificate entity user (corresponding to the foregoing digital certificate issuing node) initiates a certificate issuing request to the blockchain network. The request includes the user's digital certificate and the effective time of the digital certificate desired by the user. During specific implementation, a default defaulting effective time may also be appointed. If there is no effective time in the request, the default shall prevail.

The certificate issuance of the digital certificate may include:

Each blockchain node collects a digital certificate issuing request in a network and verifies whether digital certificate information is correct, including verification of the digital certificate format check and signature verification. Only the digital certificate is in the correct format and passes the signature verification, it can be considered that the digital certificate has passed the verification, otherwise it can be regarded that the verification is not passed.

Each blockchain node generates a new block based on the consensus mechanism. Each node participating in the consensus checks the effective time of the digital certificate desired by the user, and only records the digital certificate that has reached the effective time and its status information in the blockchain.

The present example also provides a use of digital certificates, which includes the following steps.

During the use of a digital certificate (for example, security protocols such as Transport Layer Security (TLS) and Internet Security Protocol (IPSec)), a certificate entity user needs to submit the certificate to a relying party, and the relying party checks the validity of the certificate.

If the relying party stores complete blockchain information, the certificate and the status of the certificate may be searched in the blockchain: if the latest status of the digital certificate is normal, the digital certificate is valid; otherwise, the digital certificate is invalid (if there is no certificate information in the blockchain, it means that there is no such digital certificate or the digital certificate is not yet valid, and if there is a digital certificate but the status is canceled or suspended, the digital certificate is not available).

If the relying party does not have blockchain information locally, a certificate query request may be initiated to a blockchain network. The request contains certificate information to be queried, such as the value of the certificate after function calculation (such as hash transformation such as Hash function), or the certificate itself without transformation. A node in the blockchain (such as a verification node) feeds back a query result to the relying party, and the query result contains the latest status information of a digital certificate to be checked. If the latest status of the digital certificate is normal, the digital certificate is valid; otherwise, the digital certificate is invalid (if there is no certificate information in the blockchain, it means that there is no such digital certificate or the digital certificate is not yet valid, and if there is a digital certificate but the status is canceled or suspended, the digital certificate is not available).

The present example also provides a method for canceling, suspending, and restoring digital certificates, which includes the following steps.

A certificate entity user submits a certificate cancellation, suspension, and restoration request. The request includes the user's certificate information and information to verify the user's identity (such as the user's signature information). In addition, it may also include the desired cancellation, suspension, and restoration time.

A blockchain node collects the user's certificate cancellation, suspension, and restoration request, and verifies the user's identity according to the information submitted by the user.

Each blockchain node generates a new block using a consensus mechanism. Each node participating in the consensus checks the digital certificate cancellation, suspension, and restoration time desired by the user, and only records the digital certificate information that has passed the verification and reached the desired digital certificate cancellation, suspension, and restoration time and its status information in the blockchain. Here, the cancellation of the digital certificate may be the permanent termination of the use of the digital certificate; the suspension of the digital certificate is: the temporary suspension of the use of the digital certificate; and the restoration of the digital certificate is: the rewriting and starting of the use of the suspended digital certificate.

Each record includes certificate information and certificate status. The certificate information may be the value of the certificate after function calculation (for example, hash transformation such as Hash function), or the certificate itself without transformation.

For cancellation, suspension, and restoration operations, the status of the certificate recorded in the blockchain is respectively canceled, suspended, and normal.

In short, the present example provides a digital certificate. The digital certificate does not include validity period information of the digital certificate, but only includes user names, public keys, extension items, digital signatures and other information. At the same time, the present example also provides a digital certificate issuing request: a user makes a digital certificate, and issues the digital certificate and the desired effective time to a blockchain network. In addition, the present example also provides a digital certificate issuing method: a blockchain node collects a digital certificate issuing request, verifies the validity of the certificate, and adds the digital certificate that reaches the effective time and its status to the blockchain through a consensus mechanism. The validity period information in the traditional certificate is omitted, the validity period information is submitted when issuing, the blockchain consensus mechanism is fully used, and only the digital certificate that has reached the effective time is recorded.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiment.

In addition, each functional unit in each embodiment of the present disclosure may be all integrated into one processing module, or each unit may exist physically separately, or two or more units may be integrated into one unit. The integrated unit may be implemented in the form of hardware or in the form of hardware and software functional units.

Those of ordinary skill in the art may understand that all or part of the steps implementing the above method embodiment may be completed through related hardware instructed by a program, the foregoing program may be stored in a computer-readable storage medium, and when the program is executed, the steps including the above method embodiment are performed.

The foregoing is only a specific implementation manner of the present application, but the scope of protection of the present application is not limited thereto. Any person skilled in the art can easily think of changes or replacements within the technical scope disclosed in the present application, which should be covered by the scope of protection of the present application. Therefore, the scope of protection of the present application should be determined by the scope of the claims.

The invention claimed is:

1. A method for processing a digital certificate, comprising:
   receiving an issuing request for the digital certificate, wherein the issuing request comprises the digital certificate and carries validity period information corresponding to the digital certificate, the validity period information is not contained in the digital certificate, and the validity period information is used to determine an effective time of the digital certificate;
   acquiring a verification result of the digital certificate; wherein the verification result of the digital certificate is used for indicating whether the digital certification has passed verification;
   determining the effective time of the digital certificate according to the validity period information carried in the issuing request;
   wherein the verification result of the digital certificate is a verification result issued by a verification node after verification based on a consensus mechanism; and the method further comprises: when the verification result issued by verification nodes reaching a predetermined ratio indicates that the digital certificate has passed verification, or the verification result provided by a predetermined number of verification nodes indicates that the digital certificate has passed verification, determining that the digital certificate has passed verification; and
   when the effective time of the digital certificate is reached, recording, according to the verification result, the digital certificate which has passed verification to a blockchain.

2. The method of claim 1, wherein
   acquiring the verification result of the digital certificate comprises:
   acquiring the verification result issued when the effective time is reached.

3. A method for processing a digital certificate, comprising:
   receiving an issuing request for the digital certificate, wherein the issuing request comprises the digital certificate and carries validity period information corresponding to the digital certificate, the validity period information is not contained in the digital certificate, and the validity period information is used to determine an effective time of the digital certificate;
   determining the effective time of the digital certificate according to the validity period information carried in the issuing request;
   when the effective time of the digital certificate is reached, verifying the digital certificate to obtain a verification result of the digital certificate; wherein the verification result of the digital certificate is used for indicating whether the digital certification has passed verification;
   wherein the verification result of the digital certificate is a verification result issued by a verification node after verification based on a consensus mechanism; and the method further comprises: when the verification result issued by verification nodes reaching a predetermined ratio indicates that the digital certificate has passed verification, or the verification result provided by a predetermined number of verification nodes indicates that the digital certificate has passed verification, determining that the digital certificate has passed verification; and issuing the verification result of the digital certificate.

4. An apparatus for processing a digital certificate, comprising:

a processor; and memory for storing a computer program executable on the processor, wherein when the computer program is executed by the processor, the processor is configured to perform:

receiving an issuing request for the digital certificate, wherein the issuing request comprises the digital certificate and carries validity period information corresponding to the digital certificate, the validity period information is not contained in the digital certificate, and the validity period information is used to determine an effective time of the digital certificate;

acquiring a verification result of the digital certificate; wherein the verification result of the digital certificate is used for indicating whether the digital certification has passed verification;

determining the effective time of the digital certificate according to the validity period information carried in the issuing request;

wherein the verification result of the digital certificate is a verification result issued by a verification node after verification based on a consensus mechanism; and the processor is further configured to perform, when the verification result issued by verification nodes reaching a predetermined ratio indicates that the digital certificate has passed verification, or the verification result provided by a predetermined number of verification nodes indicates that the digital certificate has passed verification, determining that the digital certificate has passed verification; and when the effective time of the digital certificate is reached, recording, according to the verification result, the digital certificate which has passed verification to a blockchain.

5. The apparatus of claim 4, wherein the acquiring the verification result of the digital certificate comprises:

acquiring the verification result issued when the effective time is reached.

* * * * *